US012030742B2

(12) United States Patent
Bütler et al.

(10) Patent No.: US 12,030,742 B2
(45) Date of Patent: Jul. 9, 2024

(54) METHOD FOR FORMING AND SMOOTHING A HOLLOW-PROFILE GUIDE RAIL OF AN ELEVATOR SYSTEM

(71) Applicant: Inventio AG, Hergiswil (CH)

(72) Inventors: Erich Bütler, Ebikon (CH); Romeo Lo Jacono, Gravesano (CH); Mischa Salvenmoser, Hitzkirch (CH)

(73) Assignee: INVENTIO AG, Hergiswil (CH)

( * ) Notice: Subject to any disclaimer, the term of this patent is extended or adjusted under 35 U.S.C. 154(b) by 0 days.

(21) Appl. No.: 18/041,225

(22) PCT Filed: Jul. 23, 2021

(86) PCT No.: PCT/EP2021/070724

§ 371 (c)(1),
(2) Date: Feb. 10, 2023

(87) PCT Pub. No.: WO2022/037897

PCT Pub. Date: Feb. 24, 2022

(65) Prior Publication Data

US 2023/0322525 A1 Oct. 12, 2023

(30) Foreign Application Priority Data

Aug. 18, 2020 (EP) .................................... 20191549

(51) Int. Cl.
*B66B 19/00* (2006.01)
*B66B 7/02* (2006.01)

(52) U.S. Cl.
CPC ............ *B66B 19/002* (2013.01); *B66B 7/022* (2013.01)

(58) Field of Classification Search
CPC ......... B66B 7/022; B66B 7/02; B66B 7/1292; B66B 19/002; B23D 79/021; B23D 79/21;
(Continued)

(56) References Cited

U.S. PATENT DOCUMENTS

| | | | | |
|---|---|---|---|---|
| 4,216,846 | A * | 8/1980 | Wheeler | B66B 7/1292 187/409 |
| 4,529,062 | A | 7/1985 | Lamprey | |
| 10,246,297 | B2 * | 4/2019 | Ou | B24B 19/004 |

FOREIGN PATENT DOCUMENTS

| | | |
|---|---|---|
| CN | 105414672 A | 3/2016 |
| CN | 105414672 B | 12/2017 |

(Continued)

*Primary Examiner* — Diem M Tran
(74) *Attorney, Agent, or Firm* — William J. Clemens; Shumaker, Loop & Kendrick, LLP

(57) ABSTRACT

A method for forming and smoothing a hollow-profile guide rail of an elevator system uses a smoothing apparatus to smooth mutually opposing surfaces on a hollow-profile guide rail. The smoothing apparatus includes a guide device, a removal device and a pressing device. The guide device has rollers for moving in a low-friction manner in a longitudinal direction along a first of the opposing surfaces and to thus guide the smoothing apparatus along the first surface. The pressing device has spring elements to press the removal device away from the guide device and toward a second of the opposing surfaces. The removal device has a rasp element to remove material from the second surface during a movement in the longitudinal direction along the second surface.

13 Claims, 2 Drawing Sheets

(58) Field of Classification Search
CPC ........ B23D 79/02; B23D 1/006; B23D 1/003; B23D 1/24; B23D 1/08; B23D 1/10
See application file for complete search history.

(56) References Cited

FOREIGN PATENT DOCUMENTS

| | | | | |
|---|---|---|---|---|
| CN | 109807634 | A | * | 5/2019 |
| CN | 109866091 | A | * | 6/2019 |
| CN | 111186747 | A | | 5/2020 |
| DE | 2325832 | A1 | | 1/1974 |
| JP | 6765534 | B2 | | 9/2020 |
| WO | 2019008708 | A1 | | 1/2019 |
| WO | WO-2019159279 | A1 | * | 8/2019 |
| WO | 2020127787 | A1 | | 6/2020 |

* cited by examiner

METHOD FOR FORMING AND SMOOTHING A HOLLOW-PROFILE GUIDE RAIL OF AN ELEVATOR SYSTEM

FIELD

The present invention relates to a method for forming and smoothing a hollow-profile guide rail of an elevator system.

BACKGROUND

Elevator systems are used to convey passengers between different height levels within a building. An elevator system generally has at least one elevator car and, in many cases, a counterweight coupled to the elevator car and working in opposite directions thereto. The elevator car and optionally the counterweight are typically displaced vertically within an elevator shaft and guided by guide rails.

Conventionally, there are guide rails for guiding the elevator car and guide rails for guiding the counterweight. Surfaces of the guide rails can be used as guide surfaces on which guide shoes and/or guide rollers mounted, for example, on the elevator car can be supported in order to ensure lateral guidance of the elevator car during its vertical movement along the guide shaft. In many cases, the surfaces of the guide rails can simultaneously also be used as brake surfaces on which, for example, a brake mounted on the elevator car can engage in order to be able to brake a movement of the elevator car relative to the guide rail. A brake can act, for example, as an emergency stop and/or as a catch brake.

Conventionally, guide rails are typically formed by means of profiles that are T-shaped in cross section. A guide rail is typically composed of a plurality of portions which are mounted one above the other and mutually aligned on a shaft wall of the elevator shaft along a travel path. A solid central protrusion of the T-shaped profile protrudes from the shaft wall into the interior of the elevator shaft and can be surrounded, for example, by a guide shoe mounted on the elevator car. The guide shoe can have guide rollers or sliding elements which move along opposite surfaces of the central protrusion of the T-shaped profile and can thus be supported on the surfaces. Optionally, the same surfaces can also be used as brake surfaces.

Surfaces of the conventional T-shaped guide rails should be as planar as possible. WO 2019/008708 A1 describes an apparatus for smoothing such guide rails.

An installation of an elevator system with conventional guide rails can be labor-intensive. Particularly due to the fact that different guide rails are typically used for the elevator car and for the counterweight, the effort required for assembling these guide rails can be high. In addition, the fact that the same surfaces of the guide rails are used as guide surfaces and, optionally, as brake surfaces, can lead to problems to the effect that in the event of emergency braking, these surfaces can be deformed and their quality as guide surfaces is subsequently impaired.

Special guide rails for elevator systems have been developed by means of which the aforementioned deficits can be reduced. Such guide rails are formed by means of a hollow profile, which can be formed in a more complex way than conventional T-profiles and by means of which multiple different guide surfaces and/or brake surfaces can be formed on a single guide rail.

Examples of such hollow-profile guide rails are described in patent applications which were submitted by the applicant of the present patent application at an earlier point in time.

For example, the earlier application WO 2020/127787 A1 describes possible embodiments of hollow-profile guide rails, as can also be implemented for the guide rails described herein, and the content of the earlier application in its entirety is to be incorporated herein by reference.

Using hollow-profile guide rails can reduce the effort when assembling an elevator system since significantly fewer guide rails, i.e., in the ideal case only one or two guide rails, need to be installed in the elevator shaft. The hollow profile can thus preferably be formed by joining and/or welding different metal sheet strips. The hollow profile can be produced in a relatively dimensionally stable, easy and/or cost-effective manner.

Typically, the hollow profile is initially produced as a continuous strand and then divided into shorter partial strands for transport purposes. The partial strands can then be secured in the elevator shaft during the assembly of the elevator system. In this case, the partial strands should be arranged one above the other in parallel with the travel path of the elevator car such that they form a guide rail in a manner in which they are substantially mutually aligned and flush with one another, in which guide rail a plurality of guide surfaces and/or brake surfaces extend as planar and gap-free as possible along the travel path.

However, it has been found that, for example, when separating the originally produced long hollow-profile strand into partial strands, burr formation can occur on separating points thus produced. In addition, it has been found that local deformations can occur when producing the hollow-profile strand and/or when separating the strand into partial strands, so that a cross section of the hollow profile is not homogeneous along an entire length of the guide rail. Instead, a guide rail composed of the partial strands can have locally lateral unevenness.

It was observed that when operating the elevator system, problems can occur due to burrs and/or lateral unevenness on the guide rail. For example, increased wear can occur if, for example, a guide shoe of the elevator car is repeatedly guided over burrs or lateral unevenness. As an alternative or in addition, considerable noise development can occur, for example, if, for example, the guide shoe of the elevator car is guided over burrs or lateral unevenness. In this case, not only can noises be heard within the elevator car and thus by passengers, but they can, for example, be distributed over the guide rail and thus be disruptive in the entire building.

SUMMARY

There may therefore be a need to be able to form a guide rail in an elevator system with as little effort as possible and in particular to largely avoid the previously described problems which result from the existence of burrs and/or unevenness on the guide rail. In particular, there may be a need to be able to smooth surfaces on a hollow-profile guide rail efficiently, reliably and/or with little effort.

Such a need can be met with the subject matter of the advantageous embodiments defined in the following description.

According to the invention, a method for forming a hollow-profile guide rail of an elevator system is described. The method comprises the following steps:

- providing a plurality of portions of the guide rail,
- arranging adjacent portions in the longitudinal direction one above the other and mutually aligned,
- smoothing mutually opposing surfaces on the hollow profile of the guide rail by means of inserting a smoothing apparatus between the mutually opposing surfaces of the guide rail such that the guide device rests against a first of the surfaces and the removal device rests against a second of the surfaces, wherein the smoothing apparatus comprises:

a guide device, a removal device, and a pressing device, wherein the guide device is designed to be moved in a low-friction manner in a longitudinal direction along a first of the opposing surfaces and to thus guide the smoothing apparatus along the first surface, wherein the pressing device is designed to press the removal device away from the guide device and toward a second of the opposing surfaces, and wherein the removal device is designed to remove material from the second surface during a movement in the longitudinal direction along the second surface, and displacing the smoothing apparatus in a longitudinal direction along the first surface.

A first independent invention can be seen in a smoothing apparatus for smoothing mutually opposing surfaces on a hollow-profile guide rail of an elevator system. In this case, the smoothing apparatus has a guide device, a removal device and a pressing device. The guide device is designed to be moved in a low-friction manner in a longitudinal direction along a first of the opposing surfaces and to thus guide the smoothing apparatus along the first surface. The pressing device is designed to press the removal device away from the guide device and toward a second of the opposing surfaces. The removal device is designed to remove material from the second surface during a movement in the longitudinal direction along the second surface.

A second independent invention can be seen in a method for smoothing mutually opposing surfaces on a hollow-profile guide rail of an elevator system. The method comprises at least the following steps:

inserting a smoothing apparatus according to an embodiment of the first independent invention between the mutually opposing surfaces of the guide rail such that the guide device rests against a first of the surfaces and the removal device rests against a second of the surfaces, and displacing the smoothing apparatus in a longitudinal direction along the first surface.

A third independent invention can be seen in a method for forming a hollow-profile guide rail of an elevator system, wherein the method comprises at least the following steps:

providing a plurality of portions of the guide rail, arranging adjacent portions in the longitudinal direction one above the other and mutually aligned, and smoothing mutually opposing surfaces on the hollow profile of the guide rail by means of a method according to an embodiment of the second independent invention.

Possible features and advantages of embodiments of the invention can be considered, inter alia and without limiting the invention, to be based upon the concepts and findings described below.

In a brief and simplified manner, an essential concept underlying the invention is that it has been found that tools and methods as used for smoothing unevenness when installing conventional T-profile guide rails often cannot be used satisfactorily in the case of hollow-profile guide rails. In order to be able to smooth unevenness on such hollow-profile guide rails, a tool which is in the form of a smoothing apparatus, is structurally simple, and is specifically adapted to conditions in such guide rails is therefore proposed, by means of which unevenness can be smoothed easily, efficiently and without high risk of damaging the surfaces of the guide rails. The smoothing apparatus is designed to be inserted between mutually opposing surfaces of the guide rail. The smoothing apparatus is to be supported with a guide device on one of the opposing surfaces and to be guided by the guide device. A removal device should be able to remove protruding material from the opposing second surface of the guide rail. For this purpose, the removal device is pressed by a pressing device in a targeted manner away from the guide device toward the second surface using a suitable mechanical pretension. The entire smoothing apparatus can have a relatively simple structure. For example, the smoothing apparatus can be designed without an active actuator system and/or controller. Instead, the smoothing apparatus can be placed onto the guide rail as a passive tool by a technician and can then be moved along the guide rail and thus smooth a surface of the guide rail.

Possible properties and advantages of embodiments of the smoothing apparatus and of the use of the smoothing apparatus are explained in more detail below.

As already briefly indicated in the introduction, guide rails in elevator systems have hitherto usually been constructed by means of a plurality of solid T-profiles. The T-profiles were arranged one behind the other. A tongue-and-groove arrangement could be provided on the end faces of the T-profiles so that adjacent T-profiles could be mutually aligned. Optionally, adjacent T-profiles could be welded to one another at the end faces. Unevenness produced thereby could be smoothed using tools, such as an angle grinder, a rail plane, a belt sander or the like.

Modern hollow profile-like guide rails are constructed from metal sheets which have a substantially smaller material thickness compared to the T-profiles of conventional guide rails. Accordingly, no tongue-and-groove arrangements can generally be provided on the end faces of such hollow-profile guide rails. An alignment of adjacent guide rails can therefore be more complex than with conventional guide rails. For example, connecting elements or pins can engage in the hollow profiles of adjacent guide rails in order to be able to align them relative to one another.

However, it has been observed that when producing the hollow-profile guide rails and in particular when dividing a long rail strand into individual partial strands or rail segments, it can happen that the rail segments are deformed slightly in particular in the vicinity of their front ends, i.e., the shape and/or dimensions of the cross section of the rail segments can vary locally. It is also said that the cross section of a hollow-profile rail segment slightly "breathes" along its longitudinal extension. This can lead to lateral unevenness on surfaces of the guide rails.

Burrs on the front ends of rail segments and/or a non-exactly aligned arrangement of adjacent guide rail segments can also lead to lateral unevenness on surfaces of the guide rails.

The described lateral unevenness should be smoothed, in particular in order to avoid excessive wear on components to be guided, such as guide shoes, guide rollers or the like, and/or in order to avoid excessive noise development when displacing such components to be guided over the unevenness.

However, it has been found that methods and tools as are used when smoothing conventional T-profile guide rails appear unsuitable in many cases for hollow-profile guide rails. For example, it has been found that, as a rule, conventional rail planes cannot be used to smooth relatively complex surfaces of a hollow-profile guide rail. Even attempts to smooth unevenness by means of, for example, an angle grinder usually lead to insufficient results. In particular, it has been found that there is a high risk of damaging the sensitive surface of hollow-profile guide rails when such conventional methods and tools are used, for example by producing local indentations and/or by locally removing a layer used as corrosion protection.

A method is therefore proposed which comprises the use of a tool in the form of a smoothing apparatus. Although the tool has a relatively simple structure, it is specifically adapted to the needs and conditions when smoothing unevenness on hollow-profile guide rails.

The smoothing apparatus has a guide device, a removal device and a pressing device. Possible embodiments and properties of these components are described in detail below.

The guide device is designed to guide the smoothing apparatus, when it is moved in the longitudinal direction along the guide rail, along a first of the two opposing surfaces of the hollow profile. For this purpose, the guide device is configured to be moved in a low-friction manner in the longitudinal direction along the first surface. Friction forces between the guide device and the first surface of the guide rail should remain so small that the entire smoothing apparatus can preferably be moved manually along the guide rail by a technician.

In order to be able to guide the guide device precisely along the first surface, it should be able to be supported on the first surface either planarly or at a plurality of spaced apart positions.

According to one embodiment, the guide device can have at least two bearing devices for this purpose, which are arranged and configured such that the smoothing apparatus is to be placed onto the first surface with bearing surfaces of each of the two bearing devices and is to be moved in a low-friction manner along the first surface in order to guide the smoothing apparatus along the first surface.

The bearing devices can be designed, for example, as a sliding element or a roller. A bearing surface can be a sliding surface of a sliding element or a circumferential surface of a roller directed toward the first surface of the guide rail. The sliding element or the roller can be formed from a material or be coated with a material that allows a low sliding resistance or a low rolling resistance during a movement along the first surface of the guide rail.

According to one embodiment, the two bearing devices are arranged spaced apart in relation to the longitudinal direction.

In other words, the at least two bearing devices can be arranged on the smoothing apparatus such that they are arranged one behind the other in relation to the longitudinal direction. A distance between the bearing devices can thus preferably be greater than typical dimensions of unevenness to be smoothed. For example, such a distance can be greater than 5 cm, preferably greater than 10 cm.

According to one embodiment, the guide device can have at least one roller which is arranged and configured such that the smoothing apparatus is to be placed with a circumferential surface of the roller onto the first surface and is to be rolled along the first surface in order to guide the smoothing apparatus along the first surface.

Preferably, the guide device has at least two rollers which are arranged and configured such that the smoothing apparatus is to be placed with a respective circumferential surface of the rollers onto the first surface and is to be rolled along the first surface in order to guide the smoothing apparatus along the first surface.

By at least one or preferably even at least two of the bearing devices of the guide device being designed as a roller, the guide device can be moved in a particularly low-friction manner along the first surface of the guide rail. The relevant circumferential surface of the roller defines a relative positioning of the guide device with respect to the first surface.

According to one embodiment, the removal device can be designed to contact the second surface of the guide rail along a plane at a plurality of contact points spaced apart from one another in the longitudinal direction and to contact the second surface with at least one sharp-edged removal component in order to remove material from the second surface during the movement in the longitudinal direction along the second surface.

In other words, the removal device is preferably configured such that it does not rest against the second surface opposing the first surface only in a punctiform manner or along a line transverse to the longitudinal direction, but to contact this second surface at a plurality of different points which are spaced apart from one another in the longitudinal direction and which are located in a common plane. The removal device is thus supported, planarly or at a plurality of points of a plane formed by the second surface, on the second surface of the guide rail. While the guide device is supported on the first surface of the guide rail such that it not only can be guided by the first surface but also cannot be tilted relative to the first surface, the removal device is supported in a similar manner on the opposing second surface of the guide rail so that it is guided by the second surface and cannot substantially tilt relative to the second surface.

In this case, the removal device has a removal component. At least one end of this removal component directed toward the second surface of the guide rail is sharp-edged. In this case, the removal component is arranged and held on the removal device such that the sharp-edged end of the removal component contacts this second surface. During a movement of the removal device in the longitudinal direction relative to the second surface of the guide rail, protruding material is removed, for example by machining, from the second surface by the sharp-edged removal component. The removal component can, for example, have a single blade and thus be configured similarly to a plane.

With a removal device configured in this way, the smoothing apparatus can efficiently and easily smooth lateral unevenness on the second surface of the guide rail. The risk that more material is removed than required and, for example, indentations are generated can thus be minimized.

According to one embodiment, the removal device can have a plurality of sharp-edged removal components which are designed to contact the second surface of the guide rail along a plane at a plurality of contact points spaced apart from one another in the longitudinal direction, in order to remove material from the second surface during the movement in the longitudinal direction along the second surface.

In other words, a plurality of removal components, each contacting, with a sharp-edged end, the second surface of the guide rail, can be provided on the removal device. The contact points at which the different removal components touch the second surface should be arranged one behind the other in the longitudinal direction and be spaced apart from one another. If the smoothing apparatus is moved in the longitudinal direction along the second surface of the guide rail, the different removal components can successively remove material from the second surface at the different contact points.

Each of the different removal components can have a sharp blade similar to a plane. Alternatively, the removal device can have a plurality of projecting, sharp-edged burrs on a common surface. For example, the removal device can be designed similarly to a rasp. As a further alternative, a plurality of sharp-edged tips can be provided on the removal device as removal components, with which the removal device can remove material from the second surface. For example, the removal device can be designed similarly to a file or a surface covered with abrasive paper.

By means of a removal device configured in this way, excess material on lateral unevenness of the second surface of the guide rail can be removed particularly efficiently and/or gently.

According to one embodiment, the removal component has, in a direction transverse to the longitudinal direction, a width that corresponds to at least one width of the second surface to be smoothed.

In other words, a blade or a burr or a sum of a plurality of sharp-edged tips can have a width that is at least as wide as the second surface of the guide rail to be smoothed. The second surface can thus be smoothed over its entire width by means of the smoothing apparatus without having to displace the smoothing apparatus in a direction transverse to the longitudinal direction.

According to one embodiment, the removal device can be a passive, inherently rigid component.

In other words, the removal device can be configured as a passive component which cannot generate any movement. In particular, unlike an angle grinder or a belt grinder, for example, the removal device does not have to have a drive, controller, an energy supply and/or the like. Instead, the removal device can be designed as a very simple component and, similarly to a plane, a rasp, a file or the like, can remove material from a surface only when it is moved relative to the surface by a person.

In this case, the removal device can be designed as a rigid component in which individual regions or components of the removal device can essentially not be moved relative to other regions or components of the removal device. In particular, the removal device can be formed integrally. For example, the removal device can be designed as a plate in which blade-like or pointed projections are provided on a side directed toward the second surface.

According to one embodiment, the removal device can be held in a stationary manner relative to the guide device in a direction parallel to the longitudinal direction. Furthermore, the removal device can be held so as to be displaceable relative to the guide direction in a direction transverse to the longitudinal direction away from the guide direction.

In other words, the smoothing apparatus can be configured such that its removal device can be moved at least slightly in a direction transverse to the longitudinal direction in which the smoothing apparatus is to be displaced during smoothing of the guide rail, but cannot be displaced relative to the guide device in the longitudinal direction itself. Accordingly, the guide device and the removal device always remain at the same height in relation to the longitudinal direction when the smoothing apparatus is moved in the longitudinal direction along the guide rail. The guide device can thus always suitably support the removal device and guide it along the first surface of the guide rail. In this case, however, the removal device can move slightly toward or away from the guide device transversely to the longitudinal direction. Accordingly, the removal device can follow any unevenness or deviations from a perfectly parallel alignment of the first and second surfaces to a certain extent. In this case, the removal device is supported on the guide device via the pressing device and is mechanically preloaded by the pressing device toward the second surface to be smoothed.

According to one embodiment, the pressing device has at least one elastic spring element, which is mounted on the guide device and which is mounted on the removal device.

In other words, the pressing device has at least one elastically deformable spring element. This elastically deformable element can, for example, be a spring, an elastomer component or the like. The spring element is held or mounted on one side of the guide device. On an opposite side, the spring element is held or mounted on the removal device. Accordingly, the spring element of the pressing device connects the guide device to the removal device so that the devices can be moved slightly toward or away from one another due to the elastic deformability of the spring element.

An elasticity or a spring constant of the spring element can be selected such that the removal device is supported on the guide device via the pressing device such that it is pressed with a desired force or a desired pressure against the second surface of the guide rail to be smoothed. The force or the pressure can be selected such that excess material is efficiently removed from the surface to be smoothed when the smoothing apparatus is moved in the longitudinal direction, and that forces that occur in the process, i.e., in particular frictional forces which counteract the movement in the longitudinal direction, do not become excessively high, so that the smoothing apparatus can preferably be moved easily by hand by a person.

According to one embodiment, the pressing device has at least two elastic spring elements, each of which is mounted on the guide device and on the removal device and which are arranged spaced apart from one another in the longitudinal direction.

In other words, the removal device can be supported on the guide device via at least two spring elements arranged spaced apart in the longitudinal direction. As a result, a force transmission between the removal device of the guide device can be designed to be spatially more uniform. In particular, it can be avoided that the guide device is excessively tilted relative to the removal device about an axis transverse to the longitudinal direction.

In a method according to one embodiment of the second aspect of the invention, embodiments of the smoothing apparatus described can be used as follows for smoothing surfaces of a guide rail: first, the smoothing apparatus is inserted between the mutually opposing surfaces of the guide rail. In the process, the smoothing apparatus is positioned such that its guide device rests against the first surface of the guide rail and can be supported thereon and that its removal device rests against the second surface of the guide rail to be smoothed and is pressed against this second surface with a pressure brought about by the pressing device. The smoothing apparatus is then successively displaced in the longitudinal direction along the guide rail and thus moves along the first and second surfaces thereof.

Preferably, the smoothing apparatus is moved by a technician who holds the smoothing apparatus, for example at a handle provided thereon, and pushes the apparatus along the guide rail. During this longitudinal movement, the removal device removes excess material on lateral unevenness of the second surface of the guide rail. Optionally, the smoothing apparatus can be moved back and forth multiple times in the longitudinal direction. In order to also smooth the first surface of the guide rail, the smoothing apparatus can be removed from the position between the opposing surfaces and then inserted again rotated by 180° and can be displaced again in the longitudinal direction with the removal device then resting against the first surface.

In a method for forming a hollow-profile guide rail according to one embodiment of the third aspect of the invention, such smoothing of opposing surfaces can be carried out after a plurality of provided portions or segments of the guide rail have been arranged in the longitudinal direction one above the other and mutually aligned. Any burrs or other lateral unevenness, such as occur preferably at transitions between adjacent portions of the guide rails, can be smoothed easily and with little force.

It must be noted that some of the possible features and advantages of the invention are described herein with reference to different embodiments of a smoothing apparatus and of a method for smoothing. A person skilled in the art will recognize that the features can be suitably combined, adapted, or replaced in order to arrive at further embodiments of the invention.

Embodiments of the invention are described below with reference to the accompanying drawings, wherein neither the drawings nor the description are to be interpreted as limiting the invention.

The figures are merely schematic and not true to scale. The same reference signs indicate the same or equivalent features.

DETAILED DESCRIPTION

Figure 1:
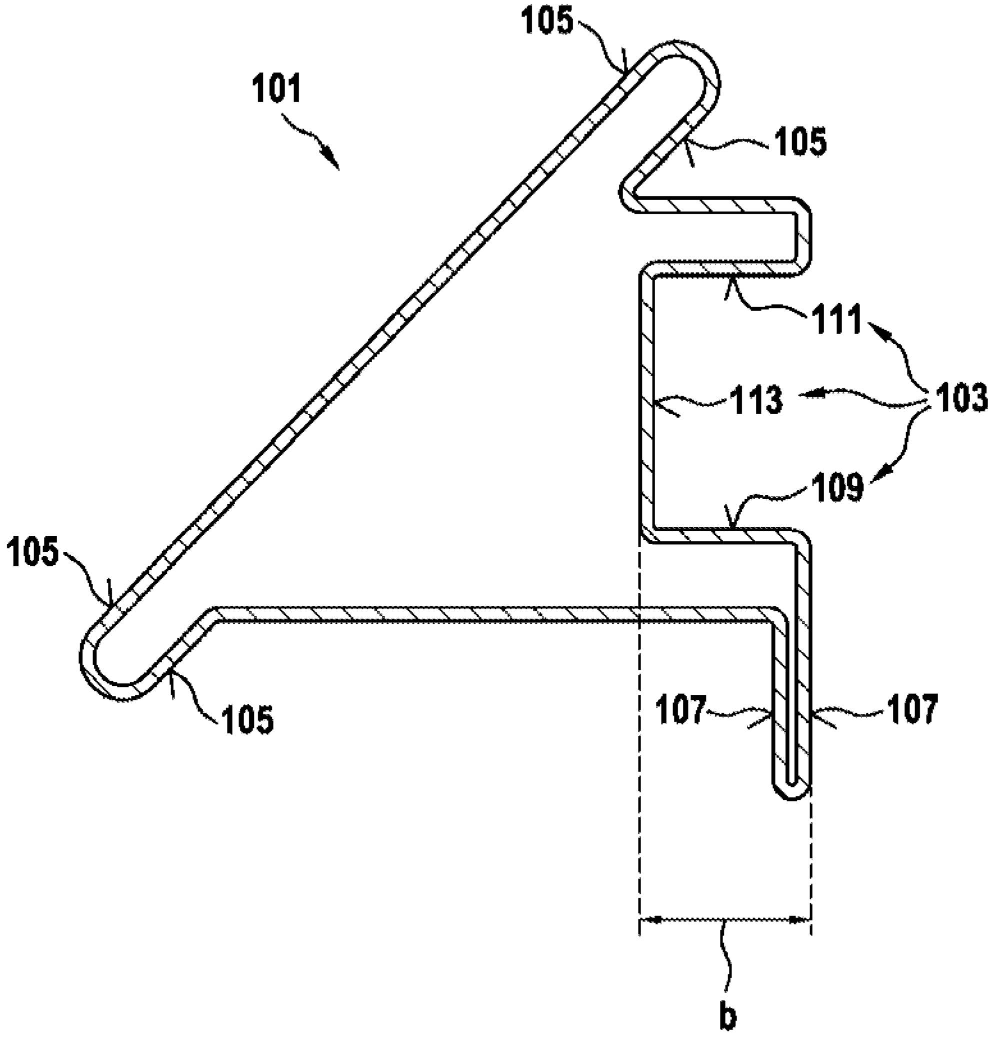
FIG. 1 shows a cross-sectional view of a hollow-profile guide rail.

FIG. 1 shows a cross section through a hollow-profile guide rail 101 of an elevator system. In contrast to conventional guide rails, which are usually constructed with solid T-shaped steel profiles that are more than one millimeter thick, such a guide rail 101 is formed from a relatively thin metal sheet. The metal sheet can be provided as a rolled profile or strip material. The hollow profile forming the guide rail 101 can have a relatively complex geometry in which a plurality of different surfaces are formed on an outer face of the hollow profile and are intended to serve different functions in the use of the guide rail 101.

For example, the guide rail 101 shown in FIG. 1 has a first region which forms guide surfaces 103 for guiding an elevator car. These guide surfaces 103 comprise a first surface 109, a second surface 111 and a third surface 113. The first surface 109 and the second surface 111 are mutually opposing and are connected by the third surface 113 arranged transversely to these two surfaces 109, 111. Preferably, the first surface 109 and the second surface 111 extend in parallel with one another. Overall, the three surfaces 109, 111, 113 form the guide surfaces 103 with a concave U-shaped cross section. Guide elements, such as a guide shoe or guide rollers mounted on the elevator car, can be moved along these guide surfaces 103 and can be supported on the three surfaces 109, 111, 113 so that the elevator car can be guided in three spatial directions.

In another region, the guide rail 101 forms guide surfaces 105 for guiding a counterweight. In the example shown, these guide surfaces 105 are formed by two convex portions of the hollow profile which are curved by 180° and aligned in opposite directions. Guide shoes on the counterweight can each be supported on opposite surfaces on these two portions so that the counterweight can be guided overall in four spatial directions.

Furthermore, the guide rail 101 can have a brake surface 107, on which, for example, the elevator car and/or the counterweight can be braked by engaging a brake shoe. In the example shown, the brake surface 107 is formed by a convexly curved or folded part of the hollow profile.

An entire guide rail 101, which is optionally many dozens or hundreds of meters long, is typically composed of portions 101*a*, 101*b*. In particular adjacent to a transition joint 115 (see FIG. 2) between adjacent portions 101*a*, 101*b*, lateral unevenness can occur, for example due to burrs which were formed in partial strands when a strand formed initially as a continuous hollow profile is separated, or due to local deformations on the portions 101*a*, 101*b*. Unevenness due to locally varying sheet metal thicknesses of the metal sheets used for the guide rail 101 can also occur.

At convex regions, such as occur, for example, on the guide surfaces 105 for guiding the counterweight or on the brake surface 107, local unevenness can be smoothed relatively easily with suitable tools. However, smoothing lateral unevenness can be difficult on concave regions, such as the region, extending in the interior of the hollow profile in a U-shape, for forming the guide surfaces 103 for guiding the elevator car. In particular, it was observed that in the attempt to smooth lateral unevenness in such concave regions with conventional tools, irreversible damage, such as local indentations, can very easily be generated in the guide rail 101. In addition, a corrosion protection layer, for example a zinc layer, provided on the surfaces of the hollow profile, can be damaged or locally removed in the attempt to smooth such surfaces in a conventional manner, which can lead to later corrosion phenomena on the guide rail 101.

Figure 2:
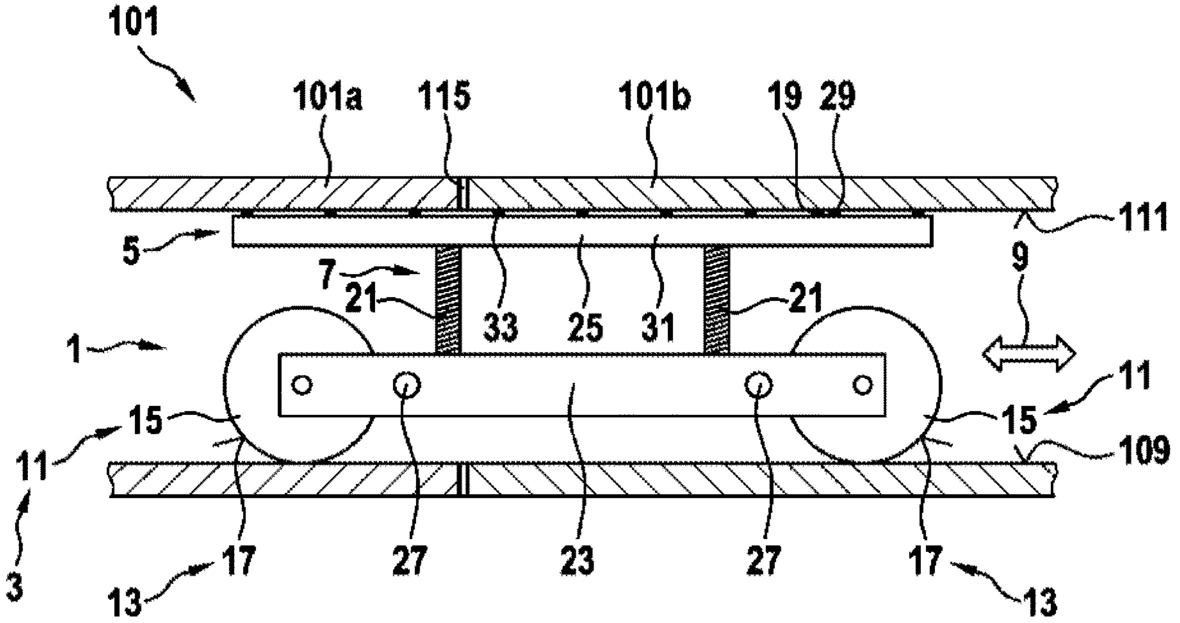
FIG. 2 shows a side view of a smoothing apparatus according to an embodiment of the present invention between surfaces to be smoothed of a hollow-profile guide rail.

A special tool in the form of a smoothing apparatus 1 is therefore described. An exemplary embodiment of such a smoothing apparatus 1 is shown in FIG. 2.

The smoothing apparatus 1 has a guide device 3, a removal device 5 and a pressing device 7. If the smoothing apparatus 1 is inserted into a concave region of a guide rail 101 with a first surface 109 and an opposing second surface 111, the guide device 3 can be moved in a low-friction manner along the first surface 109, whereas the removal device 5 is pressed against the second surface 111 by means of the pressing device 7 supported on the guide device 3. Preferably, a predetermined contact pressure dependent on the pressing device 7 acts between the removal device 5 and the second surface 111. In this case, the removal device 5 is configured to remove laterally protruding material from the second surface 111 of the guide rail 101 and to thus smooth the surface during a movement of the smoothing apparatus 1 in a longitudinal direction 9 along the guide rail 101.

In the example shown, the smoothing apparatus 1 has two bearing devices 11 in the form of rollers 15. With their circumferential surface 17 that acts as a bearing surface 13, these rollers 15 can each rest against the first surface 109 and roll along the first surface in a low-friction manner when the smoothing apparatus 1 is moved in the longitudinal direction 9. The two rollers 15 are arranged spaced apart from one another in relation to the longitudinal direction 9, so that the guide device 1 can be supported on the first surface 109 of the guide rail 101 via the rollers 15 at positions spaced apart in the longitudinal direction 9. In the example shown, the two rollers 15 are rigidly connected to one another via one or more longitudinal struts 23.

The pressing device 7 is provided between the guide device 3 and the removal device 5 in order to elastically spread the aforementioned two components in a direction away from one another, i.e., transversely to the longitudinal direction 9. For this purpose, the pressing device 7 in the example shown has two spring elements 21, one end of which is mounted on the guide device 3, i.e., for example, on the longitudinal strut 23, and the other end of which interacts with the removal device 5. With regard to their dimensions and spring tensions, the spring elements 21 are dimensioned such that a desired mechanical pretension is brought about on the removal device 5 toward the second surface 111 to be smoothed, when the smoothing apparatus 1 has been inserted between the two surfaces 109, 111.

The removal device 5 can be designed as a passive, inherently rigid component. For example, the removal device 5 can be designed as a kind of solid plate which has one or more sharp-edged removal components 19 on its surface directed toward the surface 111 to be smoothed. The removal components 19 are preferably configured and arranged such that they contact the surface 111 of the guide rail 101 to be smoothed at a plurality of contact points 29 spaced apart from one another in the longitudinal direction 9, when the smoothing apparatus 1 is arranged between the two surfaces 109, 111 which extend in parallel with one another. The different contact points 29 preferably all lie in a common plane which corresponds to the plane of the surface 111 to be smoothed.

Figure 3:
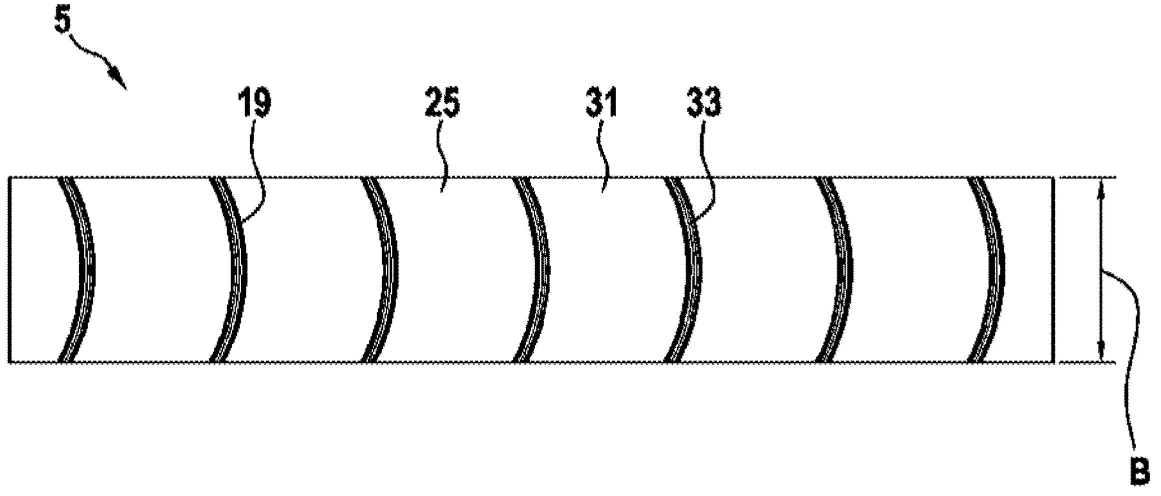
FIG. 3 shows a plan view of a removal device of a smoothing apparatus according to an embodiment of the present invention.

In the embodiment shown in FIGS. 2 and 3, the removal device 5 can be designed in the form of a rasp element 25. On a rigid, cuboid main body 31, outward-projecting rasp structures 33 can be provided in this case, which are sharp-edged at their edges directed away from the main body 31 and projecting toward the surface 111 to be smoothed. The rasp element 25 of the removal device 5 can have a width B (see FIG. 3), which substantially corresponds to a width b (see FIG. 1) of the surface 111 to be smoothed.

For smoothing the second surface 111, the smoothing apparatus 1 can thus be inserted manually between the two surfaces 109, 111 by a technician. Subsequently, the technician can move the smoothing apparatus 1, for example by means of handles 27 provided thereon, in the longitudinal direction 9 along the guide rail 101. In this case, the smoothing apparatus 1 can be moved in a relatively low-friction manner along the first surface 109 via the guide device 3 of the apparatus and guided by the device. At the same time, the removal device 5 is pressed by the pressing device 7 uniformly and in parallel with the first surface 109 against the second surface 111, and, with its sharp-edged removal components 19, removes any laterally protruding material from the second surface 111 in the region of the contact points 29. Due to the precise guidance of the smoothing apparatus 1 and due to the uniform contact pressure by the removal device 5 thereof against the second surface 111, the risk of excessively removing material from the second surface 111 and thus forming indentations is extremely low. Furthermore, due to the fact that the removal device 5 is pressed against the second surface 111 only with a limited pressure predefined by the pressing device 7, a corrosion protection layer present on the surface 111 to be smoothed is generally prevented from being locally removed or damaged.

Finally, it should be noted that terms such as "comprising," "having," etc. do not preclude other elements or steps and terms such as "a" or "an" do not preclude a plurality. Furthermore, it should be noted that features or steps which have been described with reference to one of the above exemplary embodiments may also be used in combination with other features or steps of other exemplary embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A method for forming a hollow-profile guide rail of an elevator system, the method comprising the steps of:

providing a plurality of individual portions of the hollow-profile guide rail, each of the portions having mutually opposing surfaces;

arranging adjacent ones of the portions in a longitudinal direction one above the other and mutually aligned;

smoothing the opposing surfaces of the portions by inserting a smoothing apparatus between the opposing surfaces such that a guide device of the smoothing apparatus rests against a first of the opposing surfaces and a removal device of the smoothing apparatus rests against a second of the opposing surfaces;

wherein the smoothing apparatus includes a pressing device;

wherein the guide device is movable in the longitudinal direction along the first opposing surface thus guiding the smoothing apparatus along the first opposing surface;

wherein the pressing device presses the removal device away from the guide device and toward the second opposing surface;

displacing the smoothing apparatus in the longitudinal direction along the first opposing surface; and wherein the removal device removes material from the second opposing surface during the displacement of the smoothing apparatus in the longitudinal direction along the first opposing surface.

2. The method according to claim 1 wherein the guide device has two bearing devices arranged such that when the smoothing apparatus is placed with a bearing surface of each of the bearing devices onto the first opposing surface the smoothing device can be moved along the first surface to guide the smoothing apparatus along the first opposing surface.

3. The method according to claim 2 wherein the at least two bearing devices are spaced apart in the longitudinal direction.

4. The method according to claim 1 wherein the guide device has a roller arranged such that when the smoothing apparatus is placed with a circumferential surface of the roller onto the first opposing surface the smoothing apparatus can be rolled along the first opposing surface to guide the smoothing apparatus along the first opposing surface.

5. The method according to claim 1 wherein the guide device has two rollers arranged such that when the smoothing apparatus is placed with a circumferential surface of each of the rollers onto the first opposing surface the smoothing apparatus can be rolled along the first opposing surface to guide the smoothing apparatus along the first opposing surface.

6. The method according to claim 1 wherein the removal device is adapted to contact the second opposing surface along a plane at a plurality of points spaced apart from one another in the longitudinal direction and to contact the second opposing surface with at least one sharp-edged removal component adapted to remove material from the second opposing surface during the displacement of the smoothing apparatus in the longitudinal direction along the second opposing surface.

7. The method according to claim 1 wherein the removal device has a plurality of sharp-edged removal components adapted to contact the second opposing surface along a plane at a plurality of contact points spaced apart from one another in the longitudinal direction to remove material from the second opposing surface during the displacement in the longitudinal direction along the second opposing surface.

8. The method according to claim 7 wherein the removal component has, in a direction transverse to the longitudinal direction, a width that corresponds to a width of the second opposing surface.

9. The method according to claim 1 wherein the removal device is a passive, rigid component.

10. The method according to claim 1 wherein the removal device is stationary relative to the guide device in a direction parallel to the longitudinal direction, and wherein the removal device is held displaceably relative to the guide device in a direction transverse to the longitudinal direction.

11. The method according to claim 1 wherein the pressing device has at elastic spring element mounted on the guide device and on the removal device.

12. The method according to claim 1 wherein the pressing device has at least two elastic spring elements each mounted on the guide device and on the removal device, the at least two elastic spring elements being arranged spaced apart from one another in the longitudinal direction.

13. A method for forming a hollow-profile guide rail of an elevator system, the method comprising the steps of:

providing a plurality of individual portions of the hollow-profile guide rail, each of the portions having opposing first and second surfaces;

arranging adjacent ones of the portions in a longitudinal direction one above the other and mutually aligned;

providing a smoothing apparatus having a guide device, a removal device and a pressing device;

inserting the smoothing apparatus between the first and second surfaces such that the guide device rests against the first surface and the removal device rests against the second surface, and wherein the pressing device presses the removal device away from the guide device and toward the second surface;

displacing the smoothing apparatus in the longitudinal direction along the first surface wherein the removal device removes material from the second surface during the displacement of the smoothing apparatus;

removing the smoothing apparatus from between the first and second surfaces, then inserting the smoothing apparatus between the first and second surfaces such that the guide device rests against the second surface and the removal device rests against the first surface, and wherein the pressing device presses the removal device away from the guide device and toward the first surface; and displacing the smoothing apparatus in the longitudinal direction along the second surface wherein the removal device removes material from the first surface during the displacement of the smoothing apparatus.

* * * * *